United States Patent [19]

Morokawa et al.

[11] Patent Number: 5,654,782

[45] Date of Patent: Aug. 5, 1997

[54] LIQUID CRYSTAL OPTICAL MODULATOR DEVICE WITH EACH ELECTRODE WIDTH SMALLER THAN BOTH THE LIQUID CRYSTAL THICKNESS AND THE ELECTRODE GAPS

[75] Inventors: Shigeru Morokawa, Tokyo; Yasushi Suzuki; Nobuyuki Hashimoto, both of Saitama, all of Japan

[73] Assignee: Citizen Watch Co., Ltd., Tokyo, Japan

[21] Appl. No.: 396,052

[22] Filed: Feb. 28, 1995

Related U.S. Application Data

[63] Continuation of Ser. No. 11,523, Jan. 29, 1993, abandoned

[51] Int. Cl.$^6$ .......................... G02F 1/1343; G02F 1/133; G02F 1/135; G02F 1/347
[52] U.S. Cl. .................. 349/143; 349/33; 349/49; 349/74
[58] Field of Search .................................. 359/54, 58, 87

[56] References Cited

U.S. PATENT DOCUMENTS

| | | | |
|---|---|---|---|
| 5,056,895 | 10/1991 | Kahn | 359/74 |
| 5,093,740 | 3/1992 | Dorschner et al. | 359/88 |
| 5,122,888 | 6/1992 | Iizuka et al. | 359/54 |
| 5,136,409 | 8/1992 | Fushimi et al. | 359/87 |

FOREIGN PATENT DOCUMENTS

| | | | |
|---|---|---|---|
| 0097799 | 1/1984 | European Pat. Off. | 359/54 |
| 0 121 449 | 10/1984 | European Pat. Off. | |

OTHER PUBLICATIONS

Patent Abstracts of Japan, vol. 11, No. 181 (P-585) (Jun. 11, 1987), abstract of JP 62-011828.

Patent Abstracts of Japan, vol. 5, No. 118 (P-73) (Jul. 30, 1981), abstract of JP56-059221.

Programmable Binary Phase-Only Optical Device Based on Ferroelectric Liquid Crystal SLM, broomfield, et al., Electronics Letters, Jan. 2, 1992, vol. 28, No. 1, pp. 26-28.

"Liquid crystal adaptive lens: beam translation and field meshing", Brinkley et al., Applied Optics, vol. 27, No. 21, (Nov. 1988), pp. 4578–4586.

"Twisted-Nematic Liquid Crystals for Phase Modulation in Schlieren Optical Projection Systems" Fritsch et al., Proceedings of the SID, vol. 32, No. 4, (1991), pp. 305–309.

"Multiplexing Performance of Antiferoelectric Liquid Crystal Device", Yamamoto et al., Japanese Journal of Applied Physics, vol. 31, No. 9B, (Sep. 1992), pp. 3186–3188.

*Primary Examiner*—Anita Pellman Gross
*Attorney, Agent, or Firm*—Finnegan, Henderson, Farabow, Garrett and Dunner, L.L.P.

[57] ABSTRACT

A precision liquid crystal spatial optical modulator device capable of being controlled by electric signals is realized using fine structure electrodes below a thickness of a liquid crystal layer, bringing adjacent electrodes close to one another, and driving them interconnectedly so as to spatially and finely control both liquid crystal molecule layers oriented immediately below the driving electrodes and immediately below the electrode gaps. A fine structure optical diffraction grating capable of electronic control which improves pattern positional accuracy of a liquid crystal optical modulator devices, reduces a pattern formation error and improves an aperture ratio of the liquid crystal modulator device can realized.

15 Claims, 11 Drawing Sheets

LIQUID CRYSTAL OPTICAL MODULATOR DEVICE WITH EACH ELECTRODE WIDTH SMALLER THAN BOTH THE LIQUID CRYSTAL THICKNESS AND THE ELECTRODE GAPS

This application is a continuation of application Ser. No. 08/011,523, filed Jan. 29, 1993, now abandoned.

BACKGROUND OF THE INVENTION

1. Field of the Invention

This invention relates to a spatial optical modulator device for effecting modulation of a optical wave surface. In particular, the present invention relates to a structure and method of driving a fine electrode liquid crystal device type spatial optical modulator device.

2. Description of the Related Art

To fix and control an optical wave surface, a diffraction plate using a photographic method, a diffraction grating using mechanical machining of an optical lens has been widely used in the past, while an acoustico-optical device and a transparent piezoelectric device such as a PLZT have been used to effect control that changes with time. A precision stationary optical wave surface modulation device fabricated in the course of time can be utilized for time-fixed control of the optical wave surface, but a pattern updating time of the optical wave surface modulation device must be as fast as up to about tens of milli-seconds for moving pictures. It is possible to mechanically switch a large number of holograms that have been taken in advance and reproduce them as moving pictures, as in motion pictures. However, devices and techniques suitable for updating the pictures on a real time basis for imaging and reproducing actual moving pictures have been unavailable. In contrast, various studies of moving diffraction gratings have been made in the past, but none of them have been entirely satisfactory. For example, a phase modulator device of an optical wave surface for forming a pattern by an electron beam on an oil film and controlling the film thickness requires large scale vacuum tubes and exhaust systems, and the life of the oil film is short so this method is not easy to apply. A system that scans a smectic liquid crystal using a laser beam has a resolution of up to micrometers, but since a thermal write system is employed, a long time is necessary for heat transfer and heat equilibrium. In other words, about one second is necessary for drawing one screen, and this drawing speed is not sufficient.

Liquid crystal video display devices that have been developed for the display of liquid crystal television receivers and personal computers have low response speed of 20 msec and 50 msec because they are designed to correspond to moving pictures. From the viewpoint of response speed and pixel density, liquid crystal devices for display are effective devices, and the feasibility of using the liquid crystal display device as a diffraction grating has been examined in the past. However, according to an estimation of the practical size limits of the liquid crystal pixels, the lower limit is regarded as being some tens of microns. In the case of an STN (super-twist: a liquid crystal device having a twist angle of 120° to 270°, for example) with a liquid crystal layer having a thickness of 5 μm, the minimum dimension of each of the widths of the pixel electrode and the gap between the pixel electrode is 5 μm, that is, the pixel pitch is about 10 μm and even in the case of ferroelectric liquid crystal devices, the limit is about 4 μm, and the resolution is 100 to 250 (lines/mm). A higher resolution has been believed impossible in view of the limit of the thickness of the liquid crystal layer.

The present invention provides a method of correctly realizing shape accuracy and positional accuracy of a diffraction pattern to be formed, by precisely controlling a group of liquid crystal molecules as a function of a location near a fine synthetic electric field which is generated by combining pixels, which are smaller than the thickness of a liquid crystal layer, and gaps between the pixels.

The present invention discloses a liquid crystal cell structure, orientation and material necessary for realizing this device structure, and application examples effectively utilizing the features of the diffraction device according to the present invention.

Hereinafter, the conventional optical wave surface modulator device described above, and the structure of the conventional liquid crystal display device will be explained with reference to the drawings.

Conventionally, the size of a pixel of a liquid crystal display device used for personal computers and word processors has been determined on the premise that one pixel can be visually identified as one dot by most people. Therefore, the dimensions of a pixel in the liquid crystal device has been established to be 250 to 350 μm, the gap between the pixels is about 10% of the pixel dimension, that is, from 25 to 35 μm, in order to obtain an aperture ratio of at least 80% and to improve production yield. In the reproduction of a video image, the pixels themselves need not be discriminated, but the screen becomes easier to view if the pixels are not distinctive. For this reason, devices having a pixel dimension of 100 to 200 μm have been used. Since optical enlargement is effected in a liquid crystal view finder used for monitoring an image of a video camera and in a liquid crystal device of a projection type display device, devices having a pixel dimension of 30 μm and a pixel gap of 5 to 8 μm have been produced tentatively. These devices have resolution of some dozens of lines per milli-meter, but this resolution is not sufficient for use in a diffraction device. Moreover, when the pixel dimension is reduced, the aperture ratio of the pixel becomes smaller in proportion to the square of the dimensional ratio. According to a conventional design concept, if the width of the pixel electrode and the electrode gap are set to 18 μm and 6 μm, respectively, to secure an aperture ratio of at least 50% when the thickness of the liquid crystal layer is 5 μm, resolution is about 40 lines/mm, and this value is by far lower than the level necessary for holography, that is, from hundreds to thousands of lines per millimeter. Furthermore, when the electrode pitch is reduced, the aperture ratio of the pixel drastically decreases, the resolution of at least some tens of lines per millimeter is believed unrealistic. Accordingly, the pursuit of higher resolution has been abandoned.

The problems to be solved by the present invention reside in the accomplishment of pattern formation of an optical wave surface modulator device for electronic control on a real-time basis by the use of a liquid crystal diffraction device with a higher level of accuracy. More specifically, the present invention is directed to the following points:

a) to form a precision modulation pattern for suppressing a spatial frequency noise component of a diffraction pattern, and to form a modulation pattern of a fine dimensional region below approximately the thickness of a liquid crystal;

b) to accomplish precision pattern positional accuracy by suppressing a positional error of a diffraction pattern; and c) to avoid a drop in an aperture ratio when the fine diffraction pattern is formed.

SUMMARY OF THE INVENTION

To accomplish the objects described above, the present invention not only reduces the thickness of the liquid crystal layer, but also effects control of a fine electric field distribution for the formation of a fine diffraction pattern. The present invention clarifies an electrode structure as well as a driving method for these purposes.

The conventional concept of driving the liquid crystal attempts to electrically drive the liquid crystal layer immediately below the transparent electrodes. Therefore, the dimension of a pixel electrode is recognized as being equal to the pixel dimension, and the gap between the adjacent electrodes in a transverse direction has been handled as an unnecessary region which is not electrically controlled, or as a frame region for lowering an aperture ratio of the pixel. From these points of view, the decrease of the electrode dimension invites lowering of the aperture ratio, and this provides the lower limit of the pixel pitch.

In other words, the concept of the formation of the pixel electrode starts from the idea that the pixels have a discernable dimension as a "screen display device". From this point, the greater the electrode gap, the easier the fabrication becomes so long as the gap is less than 10% of the pixel dimension. Furthermore, the pixel is designed so that isolated pixels can be controlled independently, and the existence of the gaps between the pixels is assumed to be an unconscious premise condition as "control discard region"= "OFF (electric field=0) region"="unavoidable unnecessary region". When the pixel electrodes are formed, the distance of the electrode gap is regarded as being equal to a fabrication limit dimension which is several microns. The "electrode gap dimension" described above is approximately 20 µm in the case of a large personal computer and is 5 to 15 µm in the case of a liquid crystal device for a small television receiver. As a result, the lower limit dimension of the pitch when the liquid crystal device is designed as a spatial modulator device in addition to the display device is the sum of the pixel gap, which is substantially equal to the thickness of the liquid crystal layer, and the electrode dimension of about the same size, that is, at least 10 µm pitch. Furthermore, the aperture ratio in the case is believed to be not greater than 25%. For these reasons, a further miniaturized liquid crystal device of not greater than 10 µm has been believed unrealistic due to the drop in the aperture ratio.

Reproduction of a hologram will now be considered, by way of example. Positional accuracy of a reproduced image depends on positional accuracy of the hologram, and when precise positioning of the reproduced image is necessary, positional accuracy of the diffraction pattern itself of the hologram becomes necessary. The spatial frequency of the diffraction pattern of the hologram decreases as a sinusoidal function of an intersection angle between a reference beam and an object beam. Accordingly, the pitch of the diffraction pattern can be increased by reducing this intersection angle. However, this pitch dimension and accuracy of the position and dimension of the diffraction pattern are essentially independent of one another, and there is a case where a permissible positional error of the diffraction pattern is by far smaller than a half wavelength distance of the spatial frequency of the diffraction pattern, depending on the situation. Here, we consider the case where a hologram is formed and an image is reproduced by the use of a liquid crystal device. From the aspect of the formation of the image, an image formation becomes easier by reducing the intersection angle of the object beam and the reference beam to make the pitch of the diffraction pattern coarser. Fine pixels are necessary to accurately reproduce the position of a reproduced pattern. Moreover, if the electrode gap is left constant, the aperture ratio drops even in the case of the electrodes having a smaller dimension than the thickness of the liquid crystal layer, and beam utilization efficiency drops markedly.

In order to clearly display a cubic (i.e., three dimensional) image of an object, it is necessary to precisely fabricate a diffraction pattern and to increase the area of the diffraction device to a sufficient area. To precisely fabricate the diffraction pattern, on the other hand, the electrodes themselves for forming the diffraction pattern must be smaller than the pitch of the diffraction pattern, and the pattern must be reproduced accurately.

As described above, precision shape reproduction of the pattern and precise reproduction of the position are necessary independently of the pitch of the diffraction pattern to reproduce a clear cubic image at an accurate position, and for this purpose, fine pixels having a fine dimension smaller than the thickness of the liquid crystal layer are necessary independently of the pitch of the pixels. This requirement seems impossible at first sight, but can be accomplished by the following method.

The first contrivance is the control of the liquid crystal layer immediately below the gap of the electrodes. Conventionally, this region is the region of which the control by the electrodes has been disregarded. Therefore, means for allowing driving of this gap is first considered. When the dimension of the driving electrode is reduced, a ratio of swelling of lines of electric force at peripheral portions increases. This effect becomes all the more effective when the electrode dimension is small in comparison with the thickness of the liquid crystal layer. When the dimension of the electrode gap is kept at a minimum necessary constant value, the proportion of the electrode dimension can be reduced to a dimension below a similar ratio, and the occupying ratio of the gap in this case is the square of the dimensional ratio and becomes greater than the electrode area. However, when such a structure is employed, the dimension of the electrode pitch for forming the pixel can be reduced to minimum.

The influence of the electric field generated by the electrodes under the driving condition of the liquid crystal molecule group by this fine pixel electrode group on the surrounding area can be considered in accordance with the principle of superposition, and the electric field distribution immediately below the gap between the electrodes can be controlled by the vector sum of the electric fields formed for a large number of individual surrounding electrodes. Under such a condition, when only one pixel is turned ON (is lit) while the surrounding pixels are turned OFF (not lit), this pixel to be turned ON is buried in the OFF electric field as it is pulled by the surrounding OFF electric field, and is not turned ON. However, if a plurality of electrodes adjacent to one another are interconnected and turned ON, the ON electrode group region can be lit because the electric fields are superposed with one another. In other words, even if the minimum pitch of the diffraction pattern formation does not exceed the limit of the thickness of the liquid crystal layer, the pattern formation position as well as the pattern formation can be set to a scale smaller than the thickness of the liquid crystal layer by interconnectedly driving a plurality of adjacent pixels constituted by the electrode group equipped with the electrode smaller than the thickness of the liquid crystal layer and with the electrode gaps. When the fine electrodes adjacent to one another are at an equal potential, the gap between these adjacent electrodes superposes with both of the electric fields, and a connection equipotential surface is formed in such a manner as to smoothly connect the equipotential surfaces below the electrodes in the proximity of the electrode gap. The liquid crystal molecule layer is driven without any gap due to the interconnected driving effect of the finely divided electrodes by the synthetic electric field inclusive of the pixel electrode group and the gags, and the problem of the aperture ratio can be solved.

Another effect is an effect of dividing contrast to resolution. A proportion of an electrode coverage area to the liquid crystal layer decreases by miniaturizing the electrode width and the gap. Nonetheless, the lines of electric force expand due to driving is inclusive of the electrode gap regions, so that a liquid crystal driving area ratio is improved, and instead, a current density, that is, the intensity of the electric field, weakens. The field intensity can be improved by increasing a voltage impressed on the electrodes, but the proportion of a spatial modulation value of the synthetic electric field controlled to the potentials of the individual electrodes is not improved by increasing the impressed voltage. Assuming that the electrode potential of the fine structure electrodes described above is so set as to be alternately turned ON and OFF for each electrode, and the electrode dimension is changed from an extremely large stage (W stage) which is at least 100 times the thickness of the liquid crystal layer to a stage substantially equal thereto (M stage), and further to a stage which is $1/100$ times the thickness of the thickness (N stage), the field intensity immediately below the electrode center at the W stage is substantially equal to a quotient (V/d) obtained by dividing the voltage V applied to the electrodes interposing the liquid crystal layer between them by the thickness d of the liquid crystal layer. The field intensity in this case is expressed as 1 as a relative value, and a modulation coefficient is set to 1. If the electric field immediately below center of the ON pixel is Eon and electric field immediately below the center of the OFF pixel is Eoff, the electric field immediately below the center of the gap is 0, and the mean electric field of the liquid crystal area as a whole is (Eon+0+Eoff+0)/4. At the N stage which is an extreme case of the fine pixels, the influence of the spatial electrode structure on the liquid crystal driving field disappears substantially completely as a result of superposition of Eon alternately disposed at the W stage described above, the electric field 0 of the gap and Eoff, and takes a uniform value of (Eon+Eoff)/4. At the M stage, the influence of the electrode structure on the liquid crystal layer remains sufficiently, and spatial modulation of the electric field is effected. However, being affected by the adjacent electrodes, the peripheral electric fields of the pixels are mutually attracted to the adjacent electric fields. At an intermediate stage between M and N (which is referred to as an "MN stage"), the electric field receives spatial modulation, but a modulation ratio drops due to mutual attraction of Eon and Eoff. This drop of the modulation ratio means the drop of contrast of the modulator device due to the liquid crystal molecule control. Forming a pixel region having the same dimension as that of the M stage by interconnecting a plurality of finely divided electrodes formed at the MN stage, the spatial arrangement of the pixel region is similar to that of the M stage, and the electric field of each portion of the fine pixels is set so that the field distribution of the portion corresponding to the gap electrode region of the M stage is equal to that of the M stage. The M stage approximated by the use of the fine pixel structure of the MN stage will be referred to as an "M' stage". The spatial modulation pattern Pm of the electric field generated by the electrode structure of the M stage has a minimum pattern resolution which is approximately the thickness of the liquid crystal layer, but the shape and position of the pattern Pm' generated at the M' stage can be trimmed more finely by the dimension of the fine pixels of the MN stage which is practically smaller than the thickness d of the liquid crystal layer. Accordingly, this pattern Pm' is superior to the pattern Pm in resolution. On the contrary, the synthetic pixels at the M' stage involve the electrode gaps which is some tens of percent of the area. Accordingly, the electric field of the M stage, in which these gaps are filled by the practical electrodes, is weakened. After all, the pattern Pm' has higher resolution than the pattern Pm but its contrast drops. However, this is a structure suitable for those applications in which resolution is more important than contrast, and is especially effective for forming a diffraction pattern by the liquid crystal device.

DESCRIPTION OF THE PREFERRED EMBODIMENTS

Hereinafter, the present invention will be explained in detail with reference to embodiments thereof. FIG. 1 is a structural view of a liquid crystal device having a fine electrode structure according to the first embodiment of the present invention.

Reference numerals 12 and 18 denote transparent substrates, which are ordinarily made of glass, and if necessary, a substrate made of sapphire, quartz or plastic is used. Reference numerals 14 and 16 denote transparent electrodes formed on the surface of each transparent substrate, and titanium oxide, tin oxide, indium oxide or their mixture is used for the transparent electrodes. Reference numeral 11 denotes a thickness of a liquid crystal layer, reference numeral 13 denotes a width of the electrode and reference numeral 15 denotes a gap between the electrodes. A gap H between the substrates, the electrode width W and a gap distance S with an adjacent electrode satisfy the following relation:

$$W \leq H \quad \quad 1.1$$

$$W \leq S \quad \quad 1.2$$

When W is made to be very small, that is, when W<<H, positional accuracy of a pattern formed by the liquid crystal device can be set extremely finely. The control of the liquid crystal layer can in the electrode gap region utilizing the protrusion of the lines of electric force from the electrode for the electrode gaps becomes possible by setting W and S so as to satisfy the relation $W \leq S$. The electrode gaps are great in the ordinary liquid crystal device structure. Therefore, the electric field at the gap portions becomes weak, and the liquid crystal layer is not driven but is left standing. When both of the conditions 1.1 and 1.2 are simultaneously satisfied, the electric field between the adjacent electrodes can be connected smoothly to the electric fields immediately below the electrodes. The greatest objects for introducing the condition 1.1 is to accomplish positional accuracy of the pattern of the diffraction device.

Figure 1A:
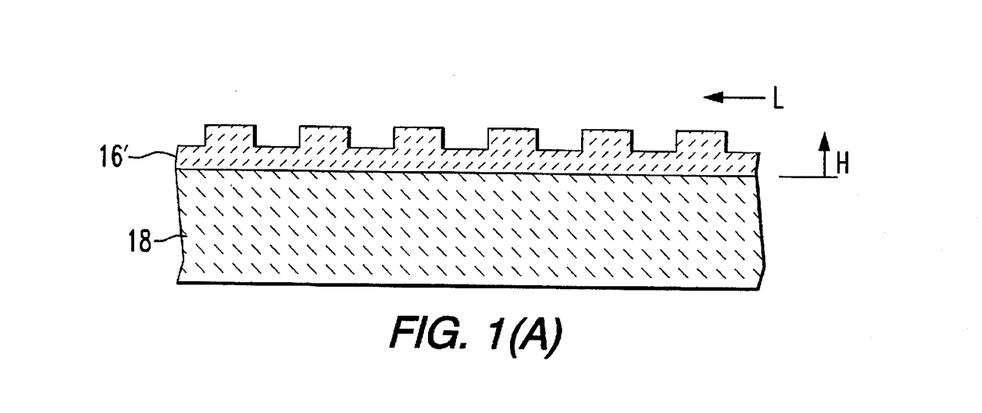
FIG. 1(A) is an explanatory partial cross-sectional view showing a variation of the shape of the fine electrodes of FIG. 1.
Figure 1B:
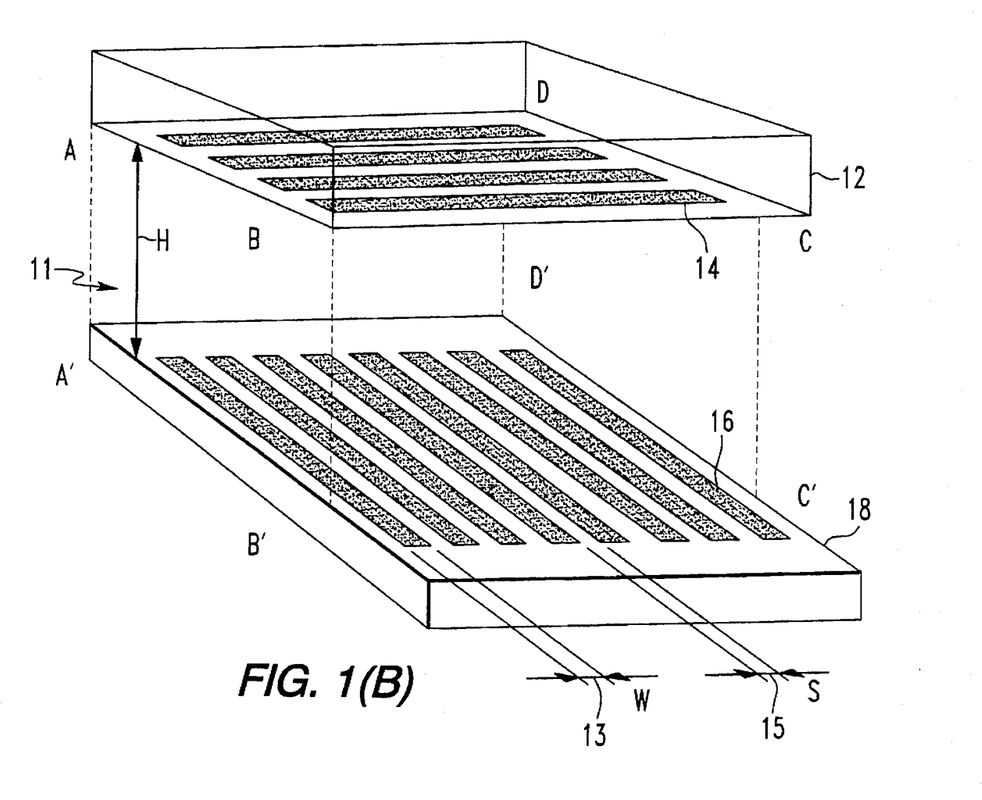
FIG. 1 is an explanatory view showing an embodiment of the present invention, and is a structural view of a liquid crystal device.

FIG. 1(A) schematically depicts an alternative fine electrode 16' arranged on substrate 18. As compared to the electrode 16 shown in FIG. 1, electrode 16' has a height h varying periodically along the length l of the electrode. Although a "stepped" variation is shown, other periodic shapes are possible. One skilled in the art would be able to fabricate a desired electrode with standard techniques used to deposit thin films of materials such as those mentioned previously with respect to electrodes 14 and 16 of the FIG. 1 embodiment.

Figure 2:
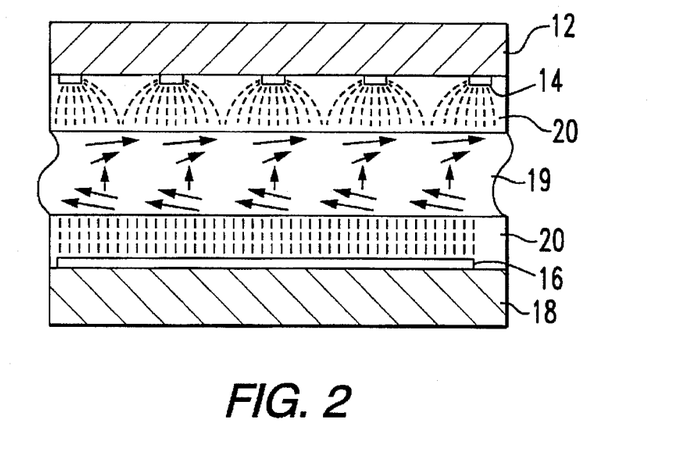
FIG. 2 is an explanatory view showing an embodiment of the present invention, and is a diagram of a synthetic electric field of the liquid crystal layer.

FIG. 2 is an explanatory view for thoroughly explaining a concept that the liquid crystal layer is controlled by a synthetic electric field owing to the lines of the electric force. As shown in FIG. 2, the lines of electrical forces are spread from a transparent and fine electrodes the width of which is less than 50% of an electrode pitch. Reference numeral 20 denotes thick and transparent insulating layers arranged adjacent to the electrode 14 and 16 to sufficiently spread and make the lines of electric force uniform before the synthetic electric field is formed in the liquid crystal layer 19 having, for example, 180° twisted LC material 19. In the construction as shown FIG. 2, the lines of electric force shown with dotted lines are sufficiently spread in the insulating layers 20 and thus in the electric field of the liquid crystal 19 a degree of periodic modulation is reduced due to narrowness of the electrode width and interval of the electrodes. Also, in FIG. 2, the liquid crystal materials 19 is constructed so that a twist angle thereof is 180°. The 180° twisted structure is apparently similar to that of a non-twisted device in which a voltage sensitivity is high and a linearity of optical modulation characteristics for voltage is prominent. Because a sharpness of electric-optical characteristics in the liquid crystal increases due to twisting.

An incident polarized light that oscillates in the oriented direction of a liquid crystal molecule is twisted and output by the twisted structure. A pixel electrode has applied there to a voltage greater than a threshold value and therefore the twisted structure of the liquid crystal adjacent to the pixel electrode is broken and is oriented in the perpendicular direction so that the incident light passes through the liquid crystal as it is. A twisted light and a directly passing light are in agreement on an oscillating face of a polarized light and in disagreement only as to phase. Therefore the liquid crystal may fulfill a function as a phase modulation device. Also, the liquid crystal in which a twist is strengthened to integer multiples of 180° may be used.

Figure 3:
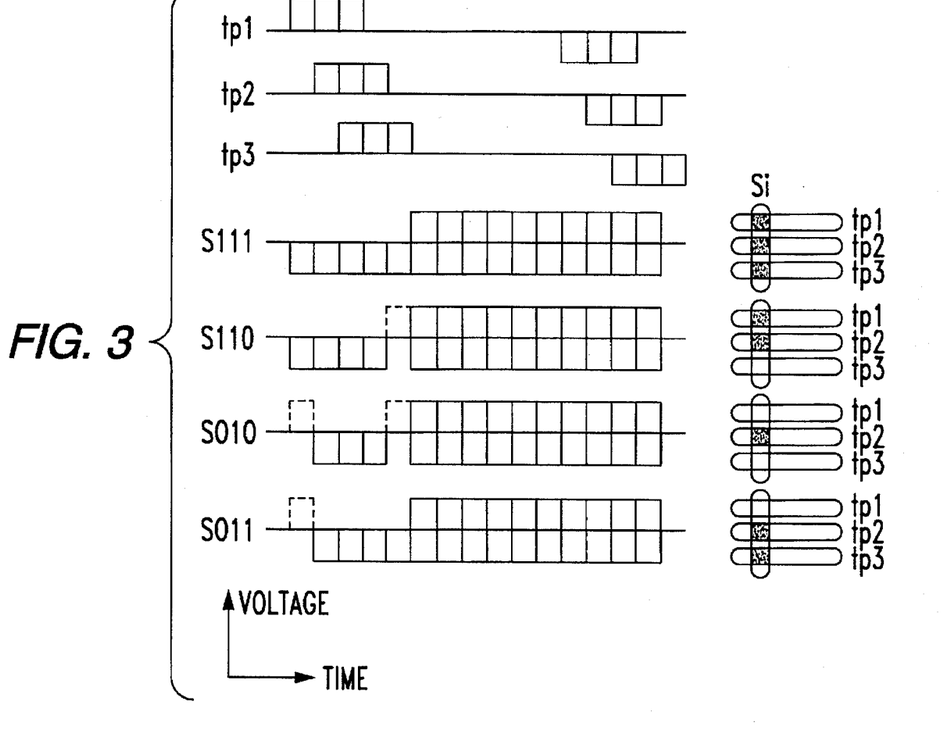
FIG. 3 is an explanatory view showing an embodiment of the present invention, and is a diagram of a wave form of timing electrodes.

Also, in order to positively realize a pixel fusion, it is necessary to consider a passive driving waveform. FIG. 3 is a diagram of a waveform of timing electrodes. Reference tp1, tp2 and tp3 shown in this figure indicate an example of a waveform of timing electrodes. If consideration is given to removing a picture regularity, polarity inversion of pixel in the liquid crystal is carried out for every line or every frame and further a regular switching thereof is carried out with random numbers. Thereby a polarity of neighboring timing electrodes becomes the same and a potential thereof at least holds a zero electrical potential from a point of view of pixel fusion purposes. In the figure the waveforms of timing electrodes are overlapped, and a symbol s111 shows an example of a waveform allowing all three pixels on three timing electrodes to turn on a light. Symbols s110 and s011 show an example of waveforms allowing two pixels on two timing electrodes to turn on a light and a symbol s010 show an example of a waveform allowing one pixel on one timing electrode to turn on a light. A voltage applied to a liquid crystal pixel is a difference between voltages of timing electrodes tpi and si, and therefore the liquid crystal is driven based on an alternating effective value.

Next, it is necessary to prevent an optical phase modulation from being caused due to providing the transparent insulation layers adjacent to the transparent insulating substrates on which the mosaic electrodes are formed because a refractive index of the transparent insulation layers is different from that of said liquid crystal layer. Therefore the transparent insulation layers may be made of transparent insulation material with a refractive index that is equivalent to that of said transparent insulating substrates for example, acrylic or gelatinous film which is buried as the transparent insulation layers to make the effect greater.

Figure 4:
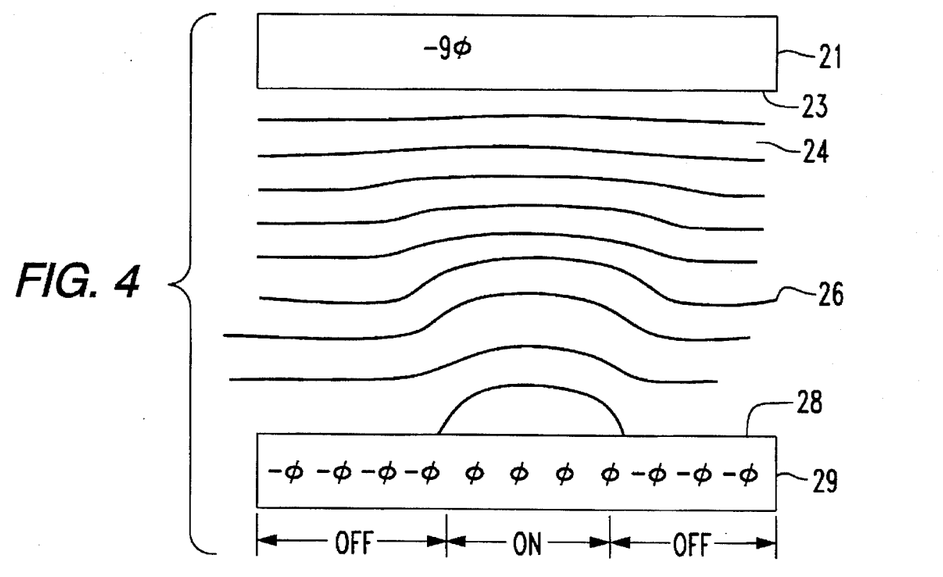
FIG. 4 is an explanatory view showing an embodiment of the present invention, and is a diagram of a electrical field distribution.
Figure 5:
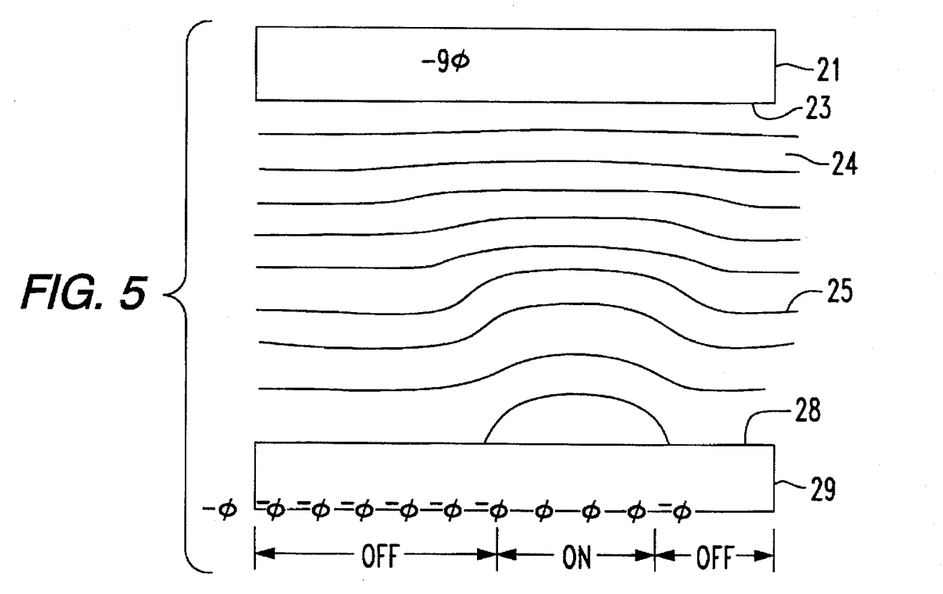
FIG. 5 is an explanatory view showing an embodiment of the present invention, and is a diagram of an electric field distribution.

FIGS. 4 and 5 are schematic views which are useful for explaining the effect of improvement of pattern positional accuracy. Reference numeral 21 denotes an upper substrate made of a transparent dielectric, reference numeral 29 denotes a lower substrate, reference numerals 23 and 28 denote transparent electrodes formed on the surface of the substrates described above, reference numerals 24 and 26 denote the section of the equipotential surfaces in FIG. 4, and reference numerals 24 and 25 denote the section of the equipotential surface in FIG. 5. FIGS. 4 and 5 show the same liquid crystal device, and the only difference resides in the voltage pattern impressed on the electrodes. The position of an ON potential is shifted by a distance corresponding to one electrode in the transverse direction, and quite naturally, the equipotential line is shifted by the distance corresponding to one electrode in the same way as the former. In other words, positional accuracy itself of the pattern is determined by the pitch of the fine electrodes independently of the thickness of the liquid crystal layer, and can be set more finely than the thickness of the liquid crystal layer.

Figure 6A:
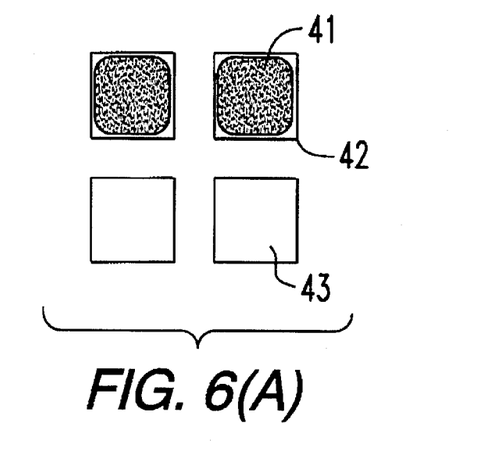
FIGS. 6(A)–6(C) are explanatory views showing an embodiment of the present invention, and is a diagram showing a transverse electric field effect.
Figure 6B:
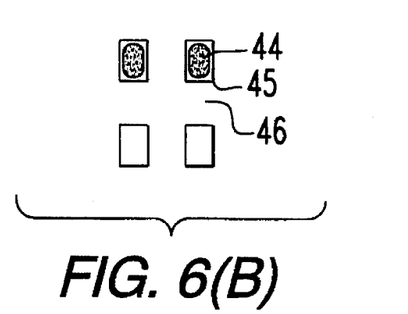
Figure 6C:
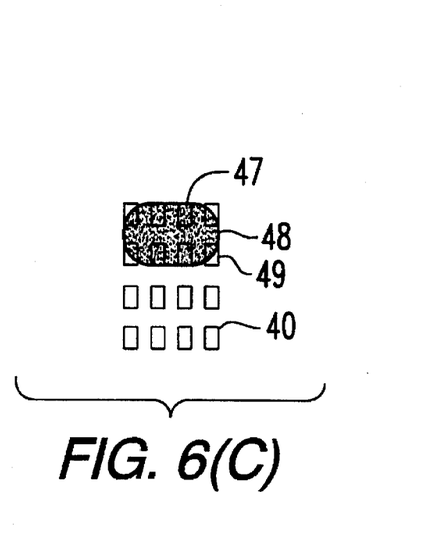

FIGS. 6(A)–6(C) are explanatory views useful for explaining a transverse electric field effect in the fine pixel group when the conditions 1.1 and 1.2 are simultaneously satisfied. In FIGS. 6(A)–6(C) the electrode dimension and the electrode gap are changed to be the same as the thickness of the respective liquid crystal layer, and the mode of the distribution of the electric field in this case is shown. In the state shown in FIG. 6(A), reference numerals 42 and 43 denote pixel electrode portions having the conventional dimension, and reference numeral 41 denotes the pixel shape when the electrode portion 42 is turned ON. The electric field of the portion 42 immediately below the electrode is substantially uniform overall, and only the peripheral portion is slightly weaker. With reference to FIG. 6(B), numeral 45 denotes the shape of the electrode portion when the electrode dimension is reduced while the electrode gap is maintained the same as in FIG. 6(A), under the condition of the same liquid crystal thickness and the same impressed voltage. Reference numeral 44 denotes the shape of the pixels when the electrode portion 45 is turned ON, and reference numeral 46 denotes the pixel gap. Since the electrode dimension is reduced while the gap is kept constant, the proportion of the area immediately below the electrode to the total area, that is, an aperture ratio, drops drastically because the condition depicted in FIG. 6(A) is changed to the condition depicted in FIG. 6(B). Furthermore, the ON range of the shape of the pixel 41 with respect to the electrode shape 42 becomes smaller than the electrode because the electric field around the peripheral portion becomes smaller. The ratio of the decrease of the area of the pixel 44 to the shape 45 of the electrode portion under the condition depicted in FIG. 6(B) is greater than the ratio of the decrease of the area of the pixel 41 to the shape 42 of the electrode portion under the condition depicted in FIG. 6(A).

The first effect of the present invention resides in that a high aperture ratio is accomplished by miniaturizing the electrodes. The condition depicted in FIG. 6(C) is the one under which the electrode dimension of the condition depicted in FIG. 6(B) is further reduced so that "eating" of the electrodes becomes substantially 100%, and the gaps between the electrodes of the fine pixel electrodes are packed. The lines of the electric force swell in the transverse direction and the electric field immediately below the electrodes becomes weaker. Nonetheless, the electric field at the gap portions of the electrodes is the vector sum of the surrounding electric fields, so that when all the surrounding electrodes are "ON", the electric field at the gap portions approaches "ON" and when all the surrounding electrodes are "OFF", the electric field at the gap portions approaches "OFF". In other words, whereas the field intensity is zero when the dimension of the electrode gap portions is great, the electric field can be impressed by reducing the gap. The electric field which is weakened by swelling of the lines of electric force, too, can be reinforced by reinforcing the impressed voltage. As a result, the liquid crystal immediately below the electrode that has been "eaten" nearly 100% by eating of the electrode, can be turned ON, and furthermore, the pixels can be expanded and interconnected by increasing the impressed voltage, so that the liquid crystal of the electrode gaps can be driven. In consequence, the problem of the drop of the aperture ratio that has been the critical problem with the fine pixel liquid crystal device can be solved by improving the aperture ratio. This effect is brought forth by interconnected driving of a plurality of fine pixels rather than by the thickness of the liquid crystal layer that was originally believed unnecessary.

Figure 7:
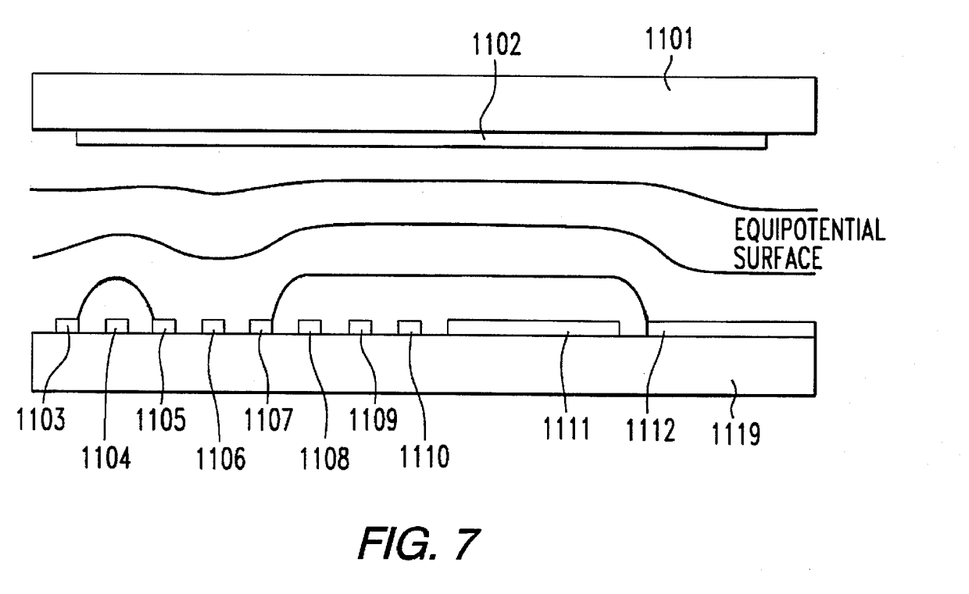
FIG. 7 is an explanatory view showing an embodiment of the present invention, and is a diagram of an electric field distribution.

The second important effect of the present invention resides in that the present invention demonstrates the possibility of interconnecting a plurality of adjacent pixels and driving them in the driving condition as in the pixel forming electrode condition depicted in FIG. 6(C). The driving effect is limited even when each fine pixel is individually driven, but when a plurality of pixels are interconnected as shown in FIG. 4, FIG. 6(C) and FIG. 7, the surrounding electrode groups as a whole inclusive of the gap regions indicated by reference numeral 48 can be turned OFF. The liquid crystal layer of this region eventually forms a continuous OFF region. On the contrary, the electrode 49 is turned ON, and an interconnected ON region pixel 47 inclusive of the neighboring gap 48 can be formed.

FIG. 7 shows the electric field distribution in the case of interconnected driving of the pixels in the structure consisting of the fine pixel electrodes and the gaps. In FIG. 7, reference numerals 1101 and 1119 denote the upper and lower electrode substrates, reference numeral 1102 denotes a common timing electrode, and reference numerals 1103 to 1112 denote segment electrodes formed on the surface of the lower substrate. An OFF voltage and an ON voltage are applied between the segment electrodes 1119 and 1111 having a great dimension and the opposed electrode 1102, respectively. The ON voltage is applied to the electrodes 1104, 1108, 1109, 1110, while the OFF voltage is applied to the electrodes 1103, 1105, 1106. As can be appreciated clearly from the mode of the equipotential lines, the electric fields in the gaps can be connected smoothly to one another when the potential of the adjacent fine pixel electrodes is equal.

Figure 8A:
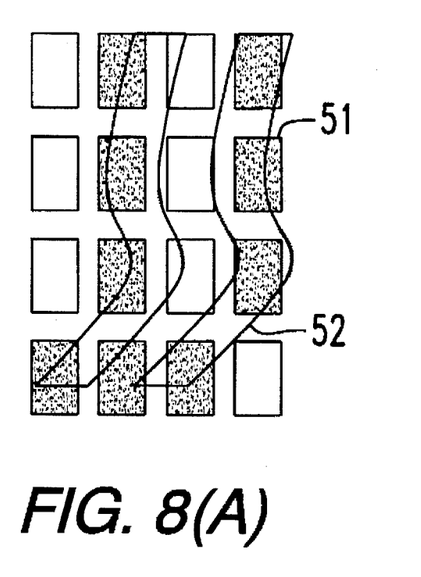
FIGS. 8(A)–8(B) are explanatory views showing an embodiment of the present invention, and shows positional accuracy of a fine pixel and a graphic error.
Figure 8B:
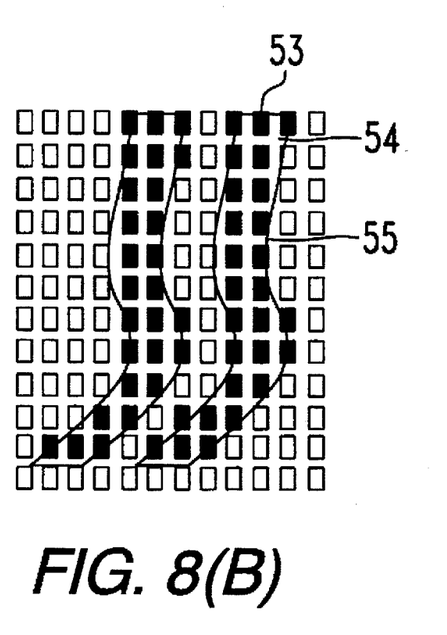

FIGS. 8(A) and 8(B) are explanatory views useful for explaining the dimension of the pixels, positional accuracy of the resulting pattern, and the spatial noise component. In FIG. 8(A), reference numeral 51 denotes coarse pixel electrodes and reference numeral 52 denotes patterns that should be formed originally by the coarse pixels. In FIG. 8(B) reference numeral 53 denotes the fine electrodes, and reference numeral 54 denotes patterns that should be formed originally by the fine pixel electrodes. The difference between the patterns to be formed (as 52 and 54) and the colored pixel (as 51 and 53) portions correspond to the spatial noise component. The finer the pixels, the smaller the spatial noise component becomes, and at the same time, it can be understood that the pattern position can be set freely by the pitch of the pixel electrodes. The pitch of the coarse pixel as 51 is substantially equal to the width and gap of the pattern to be formed, but reproduction of a smooth pattern 52 becomes difficult in such a case. In a case of the fine pixel as 53, reproduction of a similar pattern as 54 becomes possible. It can thus be understood that miniaturization of the pixel electrodes is effective for the reproduction of a high precision hologram diffraction pattern.

Figure 9:
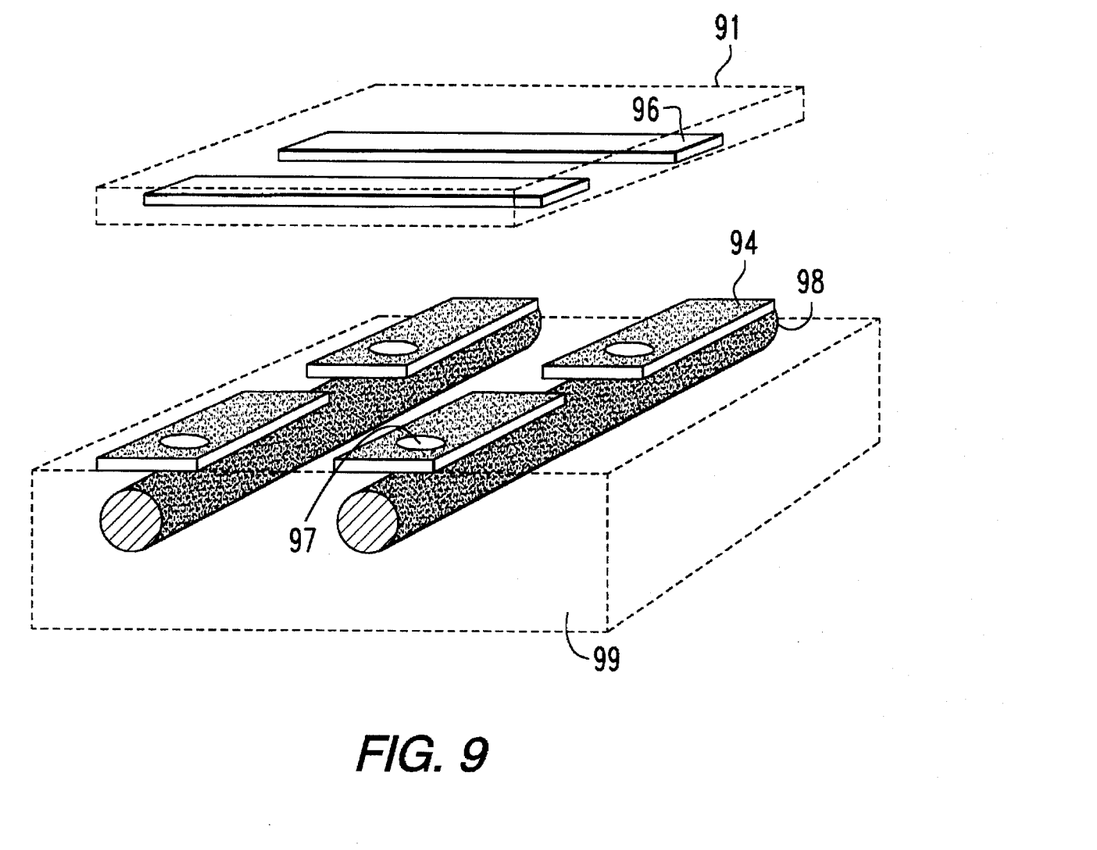
FIG. 9 is an explanatory view showing an embodiment of the present invention, and shows a structure in which a two-terminal switching device is combined with buried electrode.
Figure 10:
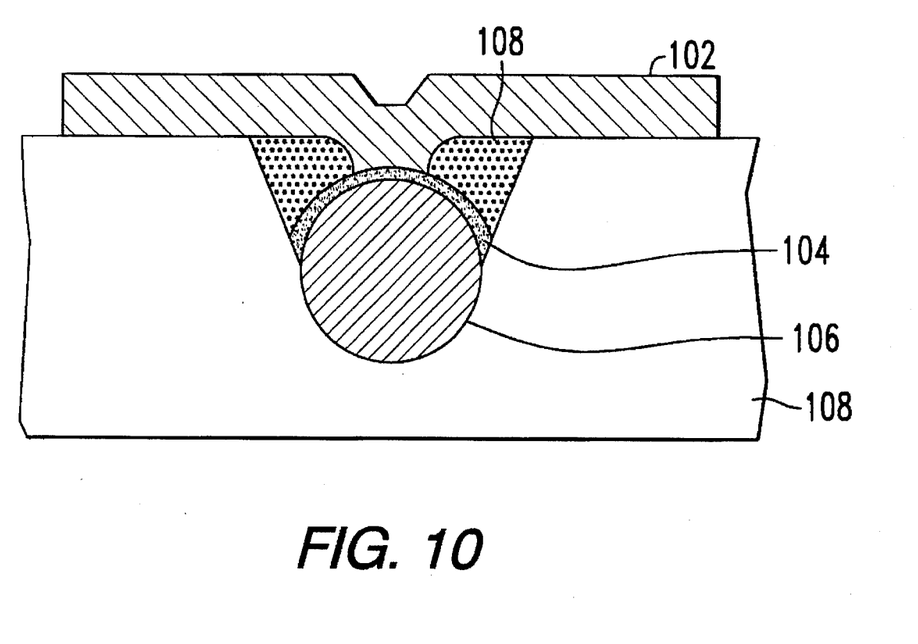
FIG. 10 is an explanatory view showing an embodiment of the present invention, and shows a section of an active liquid crystal device electrode substrate.

FIG. 9 shows a structure in which a two-terminal switching device is combined with buried electrodes, and FIG. 10 shows a cross section of 97, 98, and 99 in FIG. 9. In FIG. 9, reference numeral 91 denotes an upper substrate, reference numeral 99 denotes a lower substrate, reference numeral 96 denotes upper electrodes, reference numeral 94 denotes lower electrode, reference numeral 98 denotes metal-buried lead wires, and reference numeral 97 denotes a connection structure of the electrodes and the wirings utilizing the switching device. The substrates 91 and 99 are transparent glass substrates, the electrodes 96 are transparent electrodes, and the wirings 98 are metal wirings of aluminum, tantalum, or the like. To form the buried metal wirings, the glass substrate is first etched using hydrofluoric acid HF to form a thin metal film, and a thin insulating coating film by an oxide film or an organic thin film is formed on the thin metal film. Next, the surface of the insulating film is covered with a dielectric material to flatten the surface of the substrate, a contact hole is opened in the dielectric material, and connection is then made to the transparent electrode through the thin insulating film. In FIG. 10, reference numeral 106 denotes the buried metal wirings, reference numeral 104 denotes the insulating film, reference numeral 108 denotes a packing insulating material for surface flattening, and reference numeral 102 denotes the transparent electrode. The electrode 102 may be a metal or transparent electrode. The packing material 108 is necessary for flattening the substrate of the liquid crystal device having a fine structure. A film of tantalum oxide or aluminum oxide, or an organic film, can be used as the insulating film 104. The metal electrode 106, the insulating film 104 and the electrode 108 constitute an MIM (metal/insulator/metal) structure, and this structure functions as a two-terminal switching device. In other words, the switching device does not permit the passage of a current below a threshold voltage and rapidly allows the passage of the current beyond the threshold voltage. This operation can suppress cross-talk in driving. The passive buried electrode structure is a structure excluding the electrode 102, the insulating thin film 104 and the contact hole. This structure is much more simplified than an active switching type structure, and is more suitable for a finer structure.

In the third place, the improvement in miniaturization of the pixels and in the modulation ratio has been necessary in the past so as to realize a liquid crystal optical modulator device. When a buried wiring type structure which remarkably reduces the width of the electrodes is employed, however, the present invention can now provide a definite method and structure of miniaturization of the pixels. In this instance, a structure using a metal wire to secure electrical conductivity has significance. In this case, since the metal wire does not allow the transmission of light, modulation of the liquid crystal layer can be carried out by exclusively utilizing the electric fields of the electrode gaps. Such a structure is particularly effective when a ferroelectric liquid crystal is used. For, since a liquid crystal device is this case becomes a device having strong spontaneous polarization, a large current must be passed when the direction of the molecules is switched. A large number of fine pixels accomplishing the liquid crystal optical modulator device must be arranged in a matrix and be driven, but it is noteworthy that the high performance spatial optical modulator device utilizing a super-twist (STN) structure of a ferroelectric liquid crystal device (FLC) can be provided. The ferroelectric liquid crystal device can be driven at a liquid crystal layer thickness of not greater than 1.5 μm, and is a promising applicant for the miniaturization of the pixels. When the improvement in the contrast is taken into consideration, a structure which selectively drives the pixels by the combination with an active switching device becomes effective.

Figure 11:
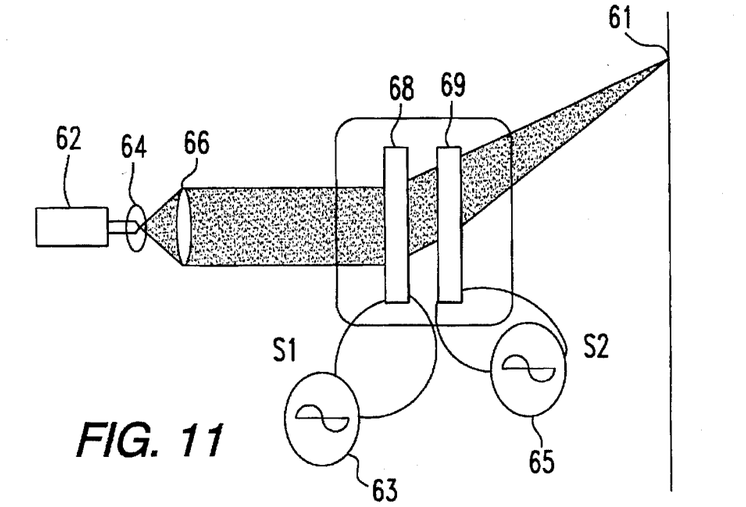
FIG. 11 is an explanatory view showing an embodiment of the present invention, and shows an embodiment of a liquid crystal optical scanning mechanism.

FIG. 11 shows still another embodiment of the present invention which uses the liquid crystal modulator of this invention as a real-time diffraction device for electronic control so as to effect the control of a laser beam in a travelling direction, and a converging function. A system for scanning a laser beam is known which prints a hologram to a rotary disc as a holographic scanner, and which scans the laser beam by rotating this disc. Optical scanning devoid of any mechanical moving portion becomes possible by the pattern modification movement of the liquid crystal hologram through the rotation of the disc by the electronic control. Theoretically, one modulator device can exhibit this function, but it is possible to broaden the deflection angle of the beam and to improve optical utilization efficiency by combining a plurality of modulator devices. In FIG. 11, reference numeral 62 denotes a laser beam source, reference numerals 64 and 66 denote optical systems including lens for expanding the optical beams and for converting them to parallel beams, reference numerals 68 and 69 denote the optical modulator devices according to the present invention, reference numerals 63 and 65 denote control circuits including a driving signal source of the liquid crystal optical modulator device and a driving circuit for the signal, and reference numeral 61 denotes a converging point of the beam. The laser 62 may be a gas laser or a semiconductor laser, but the semiconductor laser is smaller in volume and effective. The liquid crystal optical modulator devices 68, 69 are electronically controlled by the signals of the control circuits 63, 65, and the direction of the laser beam are controlled. An opto-thermal-sensitive printer can be constituted by disposing heat-sensitive paper, a heat-sensitive ribbon and paper at the converging point of the beam, two-dimensionally scanning the beam and effecting condensation control. Similarly, a complete solidi-state write/read mechanism to and from an optical disk memory or an optical card can be obtained by disposing an optical recording medium at the converging point 61 of the beam. A readout operation of an optical recording medium can be carried out by disposing a beam splitter between the lens 66 and the modulator device 68 in the same way as in the structure of the prior art, and detecting the return beam. In either case, the mechanical scanning mechanism of the prior art using a rotary mirror or an oscillating mirror can be converted to a complete solid-state or partially solid-state mechanism not having any mechanical moving portion, and the resulting system becomes superior to the prior art devices in the aspects of volume, weight and response speed. The liquid crystal optical modulator device can utilize the phase modulation and intensity modulation of the beam and the rotary modulation of the deflection plane by the liquid crystal device, or their combinations in various ways.

Figure 12A:
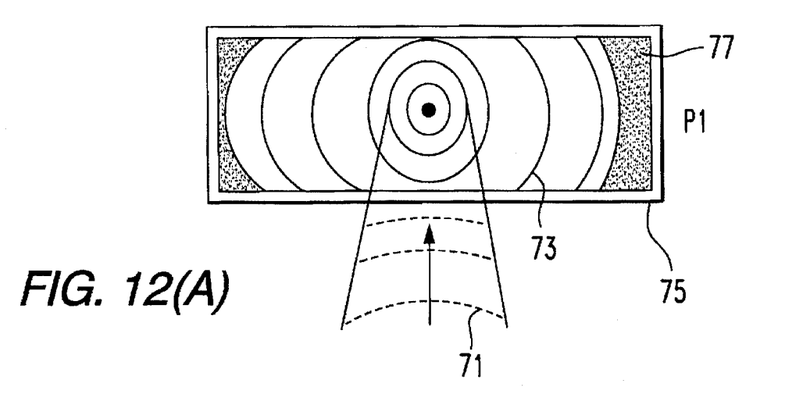
FIGS. 12(A)–12(B) are explanatory views showing an embodiment of the present invention, and shows a pattern of liquid crystal diffraction devices which are interconnected and used.
Figure 12B:
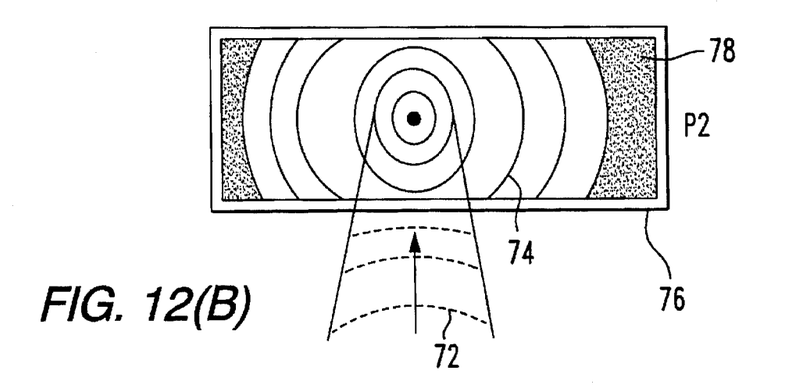

FIGS. 12(A) and 12(B) are explanatory views useful for explaining the pattern position movement of the optical modulator device used in FIG. 11.

In FIGS. 12(A) and 12(B), reference numerals 75 and 76 denote the liquid crystal optical modulator devices, reference numerals 73 and 74 denote examples of diffraction patterns formed by the liquid crystal devices, reference numerals 77 and 78 denote masking patterns, and reference numerals 71 and 72 denote incident beams. The incident beam 71 leaving the lens 66 shown in FIG. 11 is diffracted by the diffraction pattern 73, the resulting diffracted beam becomes the incident beam 72 to the devices 76, and this incident beam 72 is diffracted and condensed by the pattern 74 and is guided to 61.

Figure 13:
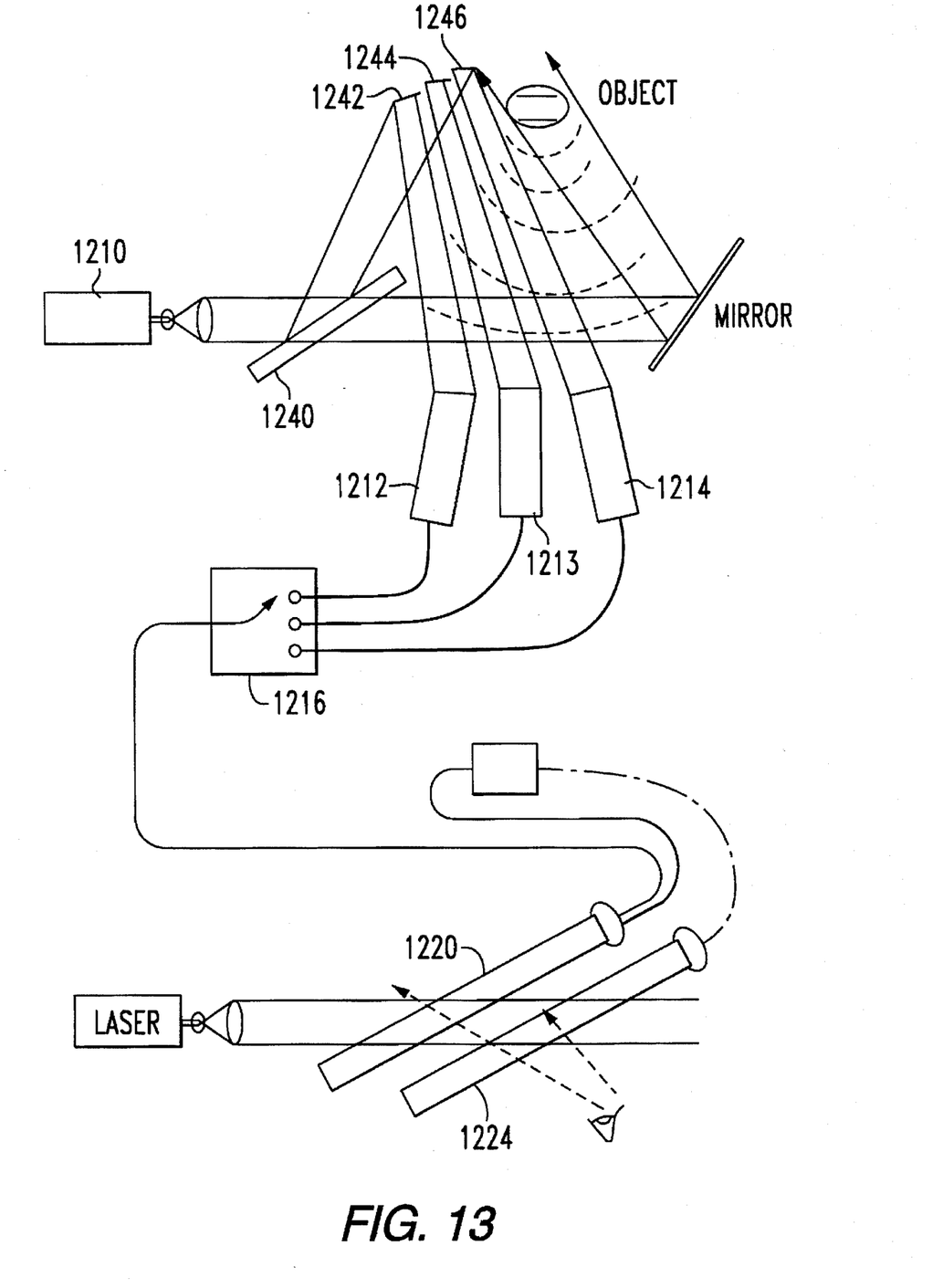
FIG. 13 is an explanatory view showing an embodiment of the present invention, and shows an imaging/transfer/reproduction system.

FIG. 13 shows a structural example of a stereoscopic television system using the liquid crystal device according to the present invention.

Reference numeral 1210 denotes a laser beam source, reference numeral 1240 denotes a beam splitter, reference numerals 1242, 1244 and 1246 denote mirrors, reference numerals 1212, 1213 and 1214 denote imaging devices, reference numeral 1216 denotes a signal synthesizer, reference numeral 1218 denotes a transmission line, reference numeral 1220 denotes the optical modulator device according to the present invention, reference numeral 1222 denotes a laser beam source, and reference numeral 1224 denotes a spatial filter comprised of the liquid crystal device. After leaving the laser, the beam is split by the beam splitter 1240 and is then irradiated onto an article. The beam is reflected, on one hand, by the mirrors 1242, 1244, 1246 and converted to reference beams. The reference beams are guided to the device inside the imaging devices 1212, 1213, 1214. A plurality of hologram are formed on the imaging devices, and their results are made into a composite. Unnecessary stray beams are cut off by the use of the spatial filter, whenever necessary. This can be controlled electronically, too, by using the liquid crystal, and flexibility to cope with varying situations can be enhanced. The use of a plurality of imaging devices is effective for enlarging the visual field as well as for collecting color data. Though only one imaging device is shown in the drawing, a plurality of optical modulator devices for reproduction are also juxtaposed and are effectively utilized to improve the visual field of the reproduced image and to impart colors.

Figure 14:
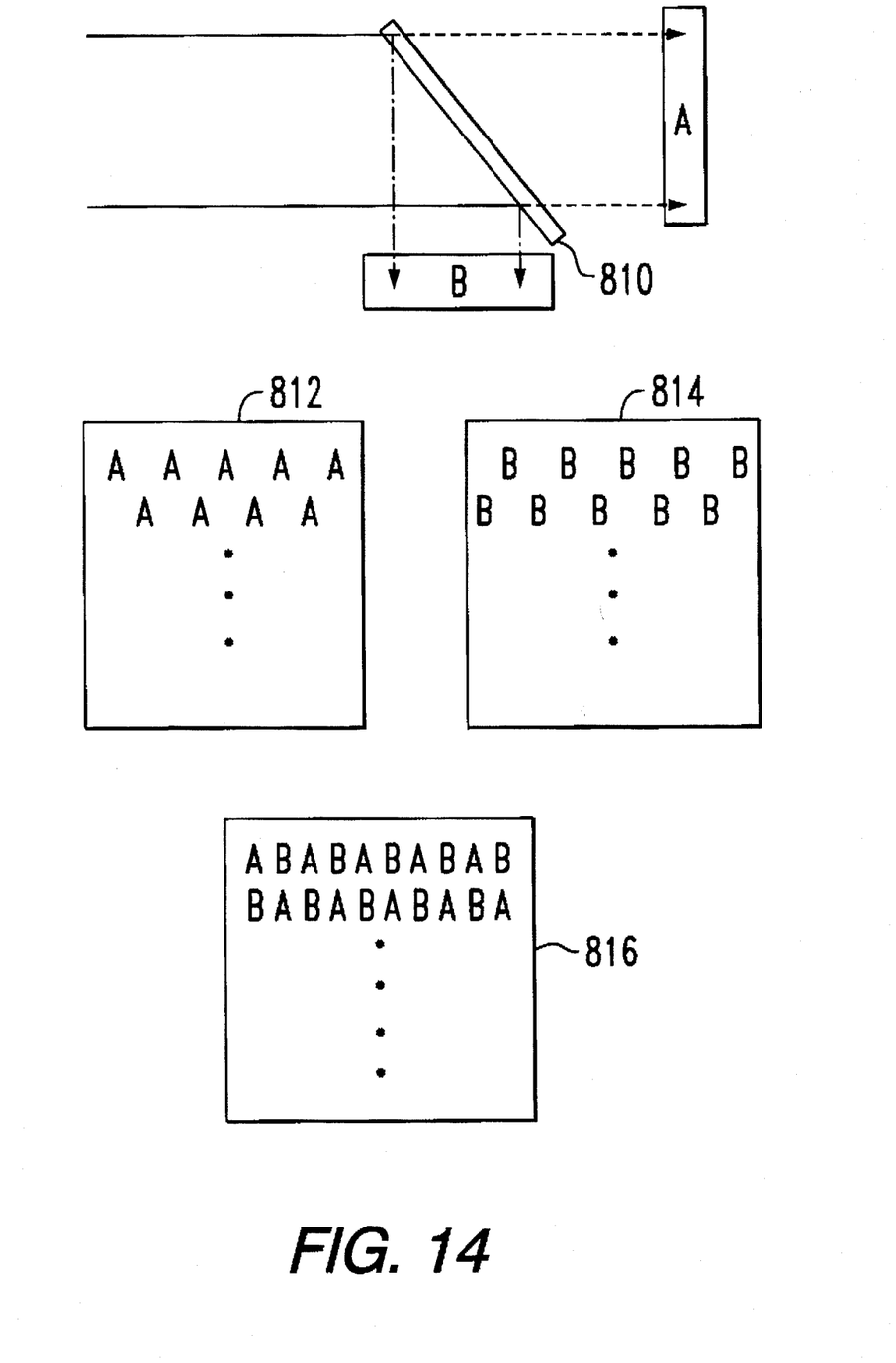
FIG. 14 is an explanatory view showing an embodiment of the present invention, and shows a structure of an active liquid crystal device electrode substrate.

FIG. 14 shows the arrangement of pixels of a multi-imaging device for improving fineness in three-dimensional imaging. Reference numeral 810 denotes a beam splitter, reference numeral 812 denotes an imaging device which collects a screen consisting of a set of pixels A, reference numeral 814 denotes an imaging device which collects a screen consisting of a set of pixels B, and reference numeral 816 denotes an image obtained by combining both A and B. The images 812 and 814 which are different by only a bit from each other are collected by the economical imaging device from the images split by the beam splitter, and a very fine image 816 is synthesized from the superposition of the image data and is utilized for the reproduction of the image.

We claim:

1. An optical modulator device comprising:
   a pair of transparent insulating substrates having opposed surfaces;
   two groups of fine electrodes, each group being disposed in a parallel and evenly spaced pattern on a respective one of the opposed surfaces of the pair of transparent insulating substrates as to be opposite each other; and
   a liquid crystal layer sandwiched between the opposite surfaces of the pair of said transparent insulating substrates;
   said fine electrodes each having a width smaller than the thickness of said sandwiched liquid crystal layer, and each said fine electrode width being less than the gap distance between fine electrodes disposed adjacent to one another, and
   the electrode gap regions encompassed by a plurality of said adjacent fine electrodes forming a continuous spatial modulation pattern, and the portion of said liquid crystal layer between said fine electrodes on opposite surfaces of the pair of substrates being driven by a transverse electric field upon the impression of a voltage on said fine electrodes.

2. An optical modulator device according to claim 1, wherein each of said fine electrodes is a rectangular transparent electrode, and said liquid crystal layer sandwiched between said substrates is divided into a plurality of pixels having a matrix arrangement by said oppositely arrayed fine electrode patterns.

3. An optical modulator device according to claim 1, wherein each of said fine electrodes is a linear metal electrode, and said liquid crystal layer sandwiched between said substrates is divided into a plurality of pixels having a matrix arrangement by said oppositely arrayed fine electrode patterns.

4. An optical modulator device according to claim 1, wherein a transparent insulator layer is arranged between each of said patterns of fine electrodes and the liquid crystal layer.

5. An optical modulator device according to claim 4, wherein a refractive index of said transparent insulation layers is equivalent to that of said transparent insulating substrates.

6. An optical modulator device according to claim 1, wherein said liquid crystal layer sandwiched between said fine electrodes includes a twist nematic structure oriented in a predetermined direction relative to said substrates.

7. An optical modulator device according to claim 1, wherein said liquid crystal layer sandwiched between said fine electrodes is a ferroelectric liquid crystal layer, and said liquid crystal layer is oriented in a predetermined direction with respect to said substrates.

8. An optical modulator device according to claim 1, wherein said liquid crystal layer comprises a twist nematic structure laying between parallel or orthogonal linear polarized plates.

9. An optical modulator device according to claim 1, wherein said liquid crystal layer is a twist nematic structure with a twist angle having a natural integer multiple of 180° to carry out optical phase modulation.

10. An optical modulator device according to claim 1, wherein said liquid crystal layer sandwiched between said fine electrodes is a ferroelectric liquid crystal layer, said liquid crystal layer is oriented in a predetermined direction with respect to said substrates, and the molecular orientation state of said ferroelectric liquid crystal layer is controlled by an electric field which is formed inside said liquid crystal layer by said fine electrodes.

11. An optical modulator device according to claim 1, wherein said liquid crystal layer is an antiferroelectric liquid crystal layer, said liquid crystal layer is oriented in a predetermined direction with respect to said substrates, and the molecular orientation state of said antiferroelectric liquid crystal layer is controlled by an electric field which is formed inside said liquid crystal layer by said fine electrodes.

12. An optical modulator device according to claim 1, wherein said device is an active addressing type device obtained by including switching means operatively connected to said fine electrodes, the switching means including a respective two-terminal switching device structure connected to each of said fine electrodes through metal wiring buried in the respective one of said substrates, and through apertures formed in a respective insulating thin film positioned between said fine electrode and said metal wiring.

13. Apparatus comprising a plurality of optical modulator devices according to claim 1, wherein said liquid crystal layer of each device is divided into a plurality of pixels having a matrix arrangement by said respective oppositely arranged fine electrode patterns, and said plurality of said optical modulator devices are superimposed and driven by different electric signals.

14. An optical modulator device comprising:
   a pair of transparent insulating substrates having opposed surfaces;
   two groups of fine linear electrodes, each linear electrode being spaced from an adjacent linear electrode by a gap, each group being disposed opposite the other in a parallel and evenly spaced pattern on a surface of a respective one of the pair of transparent insulating substrates, each of said linear electrodes having a central axis with a height being periodically changed in a waveform as a function of space; and
   a liquid crystal layer sandwiched between the pair of said transparent insulating substrates, said liquid crystal layer being divided into a plurality of pixels having a matrix arrangement by said opposite electrode patterns, a continuous spatial modulation pattern being formed at the electrode gap regions encompassed by the plurality of said adjacent fine electrodes by driving said plurality of pixels by a transverse electric field upon impressing a voltage on said fine electrodes;

each said electrode having a width and a gap between adjacent electrodes smaller than the thickness of said liquid crystal layer.

15. A method of forming a continual spatial modulation pattern, the method comprising the steps of:

arranging two groups of fine electrodes in parallel evenly spaced patterns on opposed transparent insulating substrates, the fine electrodes each having a characteristic width, and the distance between adjacent fine electrodes comprising a characteristic gap;

providing a liquid crystal layer sandwiched between the substrates, the thickness of the crystal layer being larger than the characteristic electrode width and the characteristic electrode width being smaller than the gap distance between adjacent fine electrodes;

selecting the fine electrodes; and impressing a voltage on the selected fine electrodes to form the spatial modulation pattern encompassing the area defined by the selected fine electrodes, and the characteristic gaps formed by the selected fine electrodes on one substrate and the opposite substrate being driven by a transverse electric field.

* * * * *